(12) United States Patent
Johnson et al.

(10) Patent No.: US 12,455,238 B2
(45) Date of Patent: Oct. 28, 2025

(54) TIME DELAY INTEGRATION ACQUISITION FOR SPATIAL GENOMICS IMAGING

(71) Applicant: Applied Materials, Inc., Santa Clara, CA (US)

(72) Inventors: Joseph R. Johnson, Redwood City, CA (US); Ang Li, Santa Clara, CA (US); Jean Marc Fan Chung Tsang Min Ching, Sunnyvale, CA (US); Mehdi Vaez-Iravani, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 158 days.

(21) Appl. No.: 18/361,586

(22) Filed: Jul. 28, 2023

(65) Prior Publication Data
US 2024/0035967 A1    Feb. 1, 2024

Related U.S. Application Data

(60) Provisional application No. 63/393,458, filed on Jul. 29, 2022.

(51) Int. Cl.
| | | |
|---|---|---|
| *G01N 21/47* | (2006.01) | |
| *G01N 21/64* | (2006.01) | |
| *H02K 15/60* | (2025.01) | |
| *H04N 25/711* | (2023.01) | |

(52) U.S. Cl.
CPC ..... *G01N 21/4795* (2013.01); *G01N 21/6456* (2013.01); *G01N 2021/6419* (2013.01); *G01N 2021/6421* (2013.01); *G01N 2021/6441* (2013.01); *G01N 2021/6484* (2013.01);
(Continued)

(58) Field of Classification Search
CPC ........... G01N 21/4795; G01N 21/6456; G01N 2021/6419; G01N 2021/6421; G01N 2021/6441; G01N 2021/6484; G01N 2201/0826; H02K 15/60; H04N 25/711
See application file for complete search history.

(56) References Cited

U.S. PATENT DOCUMENTS

| | | | | |
|---|---|---|---|---|
| 6,310,710 B1 * | 10/2001 | Shahar | ................... | G02B 26/12 |
| | | | | 250/236 |
| 6,466,352 B1 * | 10/2002 | Shahar | ................... | G02B 26/12 |
| | | | | 250/236 |

(Continued)

FOREIGN PATENT DOCUMENTS

KR    20190054141 A    5/2019

OTHER PUBLICATIONS

Application No. PCT/US2023/071212, International Search Report and the Written Opinion, Mailed on Nov. 20, 2023, 13 pages.

*Primary Examiner* — Dominic J Bologna
(74) *Attorney, Agent, or Firm* — Kilpatrick Townsend & Stockton LLP

(57) ABSTRACT

An imaging system for capturing spatial-omic images of biological tissue samples may include an imaging chamber configured to secure a biological tissue sample placed in the imaging system; a Time Delay and Integration (TDI) imager comprising at least one scan line; a light source configured to illuminate an area on the biological tissue sample that is being captured by the TDI imager; and a controller configured to cause the TDI imager to scan the biological tissue sample using one or more TDI scans of the biological tissue sample.

18 Claims, 10 Drawing Sheets

(52) U.S. Cl.
CPC ..... *G01N 2201/0826* (2013.01); *H02K 15/60* (2025.01); *H04N 25/711* (2023.01)

(56) References Cited

U.S. PATENT DOCUMENTS

| | | | | |
|---|---|---|---|---|
| 8,947,521 | B1* | 2/2015 | Hill | H04N 25/615 |
| | | | | 382/145 |
| 11,714,271 | B2* | 8/2023 | Cang | G02B 21/0032 |
| | | | | 250/459.1 |
| 2007/0222974 | A1* | 9/2007 | Zhao | G01N 21/8901 |
| | | | | 356/237.1 |
| 2011/0115897 | A1* | 5/2011 | Najmabadi | G01N 21/6458 |
| | | | | 348/79 |
| 2016/0109693 | A1* | 4/2016 | Feng | H04N 23/55 |
| | | | | 348/79 |
| 2018/0088358 | A1* | 3/2018 | Kliner | B22F 10/20 |
| 2018/0307019 | A1* | 10/2018 | Dixon | G02B 21/0036 |
| 2018/0359438 | A1* | 12/2018 | Pichette | H04N 25/701 |
| 2020/0033240 | A1 | 1/2020 | Cherubini et al. | |
| 2022/0197002 | A1* | 6/2022 | Cang | G01N 21/6458 |
| 2022/0214278 | A1* | 7/2022 | Trintchouk | H04N 23/45 |
| 2022/0268569 | A1* | 8/2022 | Srocka | G01N 21/8806 |
| 2024/0044863 | A1* | 2/2024 | Bencher | G02B 21/0076 |
| 2024/0045191 | A1* | 2/2024 | Li | G02B 21/0076 |
| 2025/0180883 | A1* | 6/2025 | Xu | G02B 21/0076 |

\* cited by examiner

TIME DELAY INTEGRATION ACQUISITION FOR SPATIAL GENOMICS IMAGING

CROSS-REFERENCE TO RELATED APPLICATION

This application claims priority to Provisional U.S. Patent Application No. 63/393,458 filed Jul. 29, 2022, entitled "TIME DELAY INTEGRATION ACQUISITION FOR SPATIAL GENOMICS IMAGING," the entire disclosure of which is hereby incorporated by reference, for all purposes, as if fully set forth herein.

TECHNICAL FIELD

This disclosure generally describes capturing multiplexed, spatial-omic images of biological tissue samples. More specifically, this disclosure describes camera and light configurations that reduce the capture time for a biological imaging system.

BACKGROUND

Spatial biology is the study of the cellular and sub-cellular environment across multiple dimensions. Spatial biology tools may be used to determine which cells are present in a tissue sample, where they are located in the tissue sample, their biomarker co-expression patterns, and how these cells organize interact within the tissue sample. A sample slide may be prepared with a tissue sample in various imaging workflows may be executed to generate a comprehensive image of the tissue at the cellular and sub-cellular level, producing a single-cell resolution to visualize and quantify biomarker expression. The resulting images may expose how cells interact and organize within the tissue sample.

Capturing these complex images of the cell environment may be referred to as spatial omics. High-resolution, highly multiplexed spatial omics is rapidly becoming an essential tool in understanding diseases and other biological conditions. Typically, this type of analysis involves hundreds of complex factors, variables, and processes. An integrated solution may combine imaging and process control methods into a single machine for performing spatial omics.

SUMMARY

In some embodiments, an imaging system for capturing spatial-omic images of biological tissue samples may include an imaging chamber configured to secure a biological tissue sample placed in the imaging system; a Time Delay and Integration (TDI) imager comprising at least one scan line; a light source configured to illuminate an area on the biological tissue sample that is being captured by the TDI imager; and a controller configured to cause the TDI imager to scan the biological tissue sample using one or more TDI scans of the biological tissue sample.

In some embodiments, a method of capturing spatial-omic images of a biological tissue sample may include securing a biological tissue sample in an imaging chamber of an imaging system; directing light from a light source to illuminate an area on the biological tissue sample; and causing a Time Delay and Integration (TDI) imager to scan the biological tissue sample where the biological tissue sample may be illuminated by the light the light source using one or more TDI scans of the biological tissue sample.

In some embodiments, an imaging system for capturing spatial-omic images of biological tissue samples may include an imaging chamber configured to secure a biological tissue sample placed in the imaging system; a Time Delay and Integration (TDI) imager; a light source configured to illuminate an area on the biological tissue sample that is being captured by the TDI imager with a plurality of distinct wavelengths; and a controller configured to cause the TDI imager to simultaneously capture a plurality of distinct images of the biological tissue sample. Each of the plurality of distinct images may correspond to one of the plurality of distinct wavelengths.

In any embodiments, any or all of the following features may be implemented in any combination and without limitation. The controller may cause the TDI imager to scan the biological tissue without requiring a mechanical repositioning, stabilization, or focus between capturing scan lines in a column. The light source may deliver light to the biological tissue sample through a fiber-optic line that may project light in an illumination area that is approximately circular onto the biological tissue sample. The light source may deliver light to the biological tissue sample through an aperture having a rectangular shape. The aperture may project a rectangular illumination area onto the biological sample onto a rectangular field-of-view of the TDI imager. The light source may deliver light to the biological tissue sample through an aperture having a having a shape that matches a shape of a field-of-view of the TDI imager. The light source may deliver light to the biological tissue sample through a fiber-optic line having an oval shape. The system may include a fiber optic bundle comprising a plurality of fiber-optic lines, each of which are configured to deliver different wavelengths. Each of the plurality of fiber-optic lines may have an oval or rectangular shape. Each of the plurality of fiber-optic lines may be positioned to direct light at different portions of the biological tissue sample. The system/method may assemble equally spaced lines from a plurality of scan line columns from the TDI imager. The light from the light from the light source may include a plurality of distinct wavelengths that may be simultaneously projected on the biological tissue sample. The system/method may filter the plurality of distinct wavelengths using a plurality of filters in front of the TDI imager. The system/method may filter the plurality of distinct wavelengths using a beam splitter in front of the TDI imager. The TDI imager may include a plurality of scan lines, and each of the plurality of scan lines may capture one of the plurality of distinct images. The TDI images may include a plurality of individual TDI cameras, and each of the plurality of individual TDI cameras may be directed at a different location on the biological tissue sample to simultaneously capture the plurality of distinct images. The system may include a filter wheel in front of the TDI imager that may include a plurality of filters corresponding to the plurality of distinct wavelengths. The light source may include a broad-spectrum light source that combines the plurality of distinct wavelengths onto a single illumination area.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
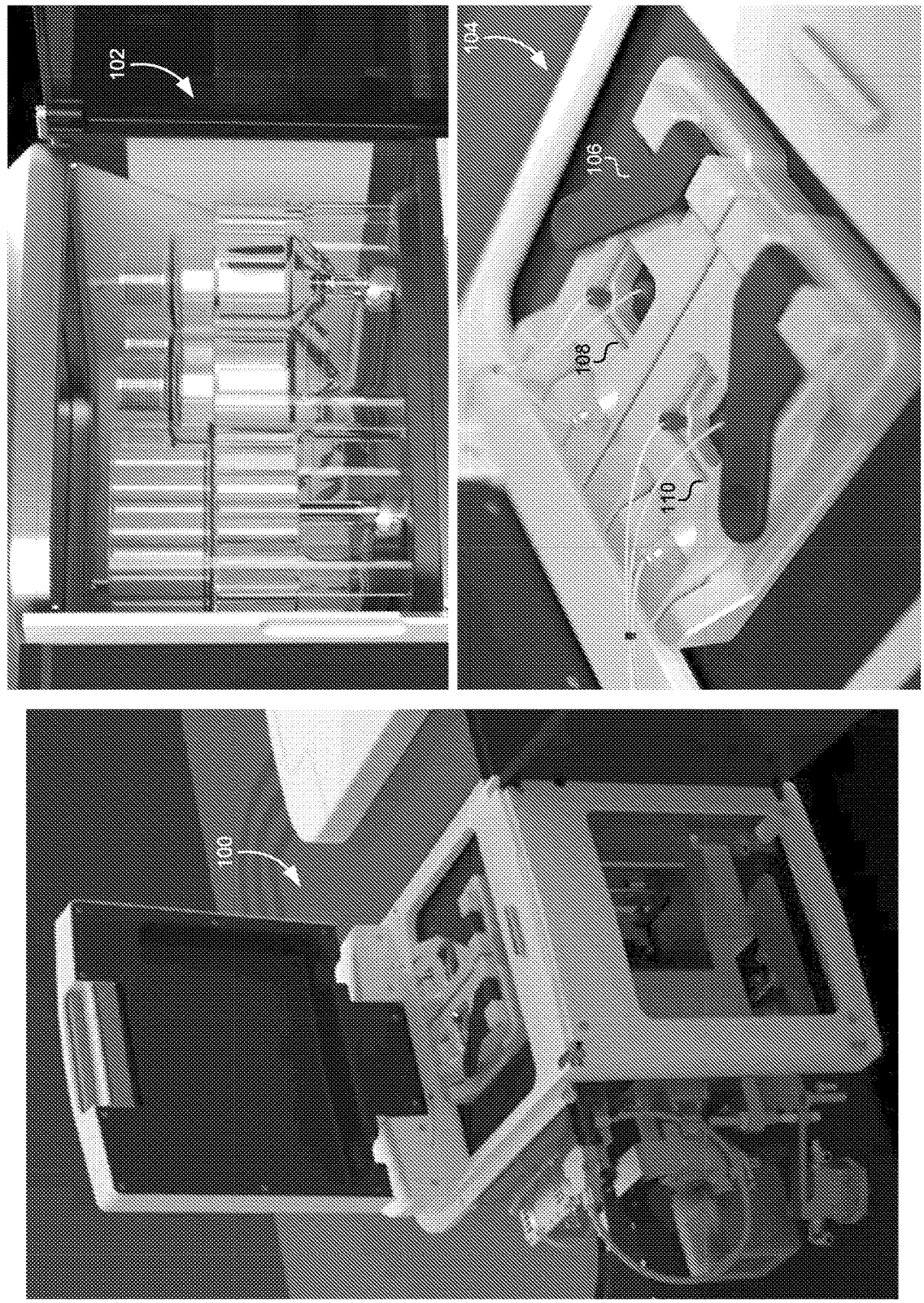
FIG. 1 illustrates a high-resolution biological imaging system, according to some embodiments.

FIG. 1 illustrates a high-resolution biological imaging system 100, according to some embodiments. The imaging system 100 may be configured to combine multiple imaging workflows together into a single process to perform an automated spatial analysis of the tissue sample. The imaging system 100 may include multiple imaging chambers 108, 110, each of which may be configured to perform individual imaging operations on different tissue samples. A fluid system 102 may provide integrated fluid control to provide a plurality of fluorophores and/or other fluids to the imaging chambers 108, 110 during the imaging process. Different fluorophores and reagents may be loaded into containers in the fluid system 102 such that these fluids can be automatically provided to the imaging chambers 108, 110 when needed during the imaging process.

The imaging system 100 may include a computer system comprising one or more processors, one or more memory devices, and instructions stored on the one or more memory devices that cause the imaging system 100 to perform the imaging operations on the tissue samples in the imaging chambers 108, 110. Thus, each of the operations of the imaging process described herein may be represented by instructions stored on the one or more memory devices.

In an example imaging workflow, a user or automated process may load a tissue sample onto a slide, and load the slide into an imaging chamber 108. After securing the tissue sample in the imaging chamber 108, fluids may then be automatically pumped into the imaging chamber 108. For example, some fluids may be pumped into the imaging chamber 108 in order to clean the tissue and/or remove previous fluids or fluorophores that may be present in the imaging chamber 108. New fluids or fluorophores may be provided from the fluid system 102 in an automated fashion, as specified by the instructions executed by the controller. During a typical cycle, one or more fluorophores may be pumped into the imaging chamber 108 that are configured to attach to the cells in the tissue sample in order to visually highlight different features within the sample. Corresponding laser wavelengths may then be used to illuminate the sample in the imaging chamber 108, and a camera may capture images of the illuminated sample. The fluorophores may be matched with different laser wavelengths that are configured to illuminate those specific fluorophores.

After the imaging process is complete, the raw images from the system may be converted into RNA spots by the controller. These RNA spots may be visualized as cell-type clusters that are highlighted by the different fluorophores. Multiple images may then be merged for a multi-omic analysis of the tissue sample. Software tools provided by the controller of the imaging system 100 may provide different visualizations, data filtering, and analysis tools for viewing the images.

Figure 2:
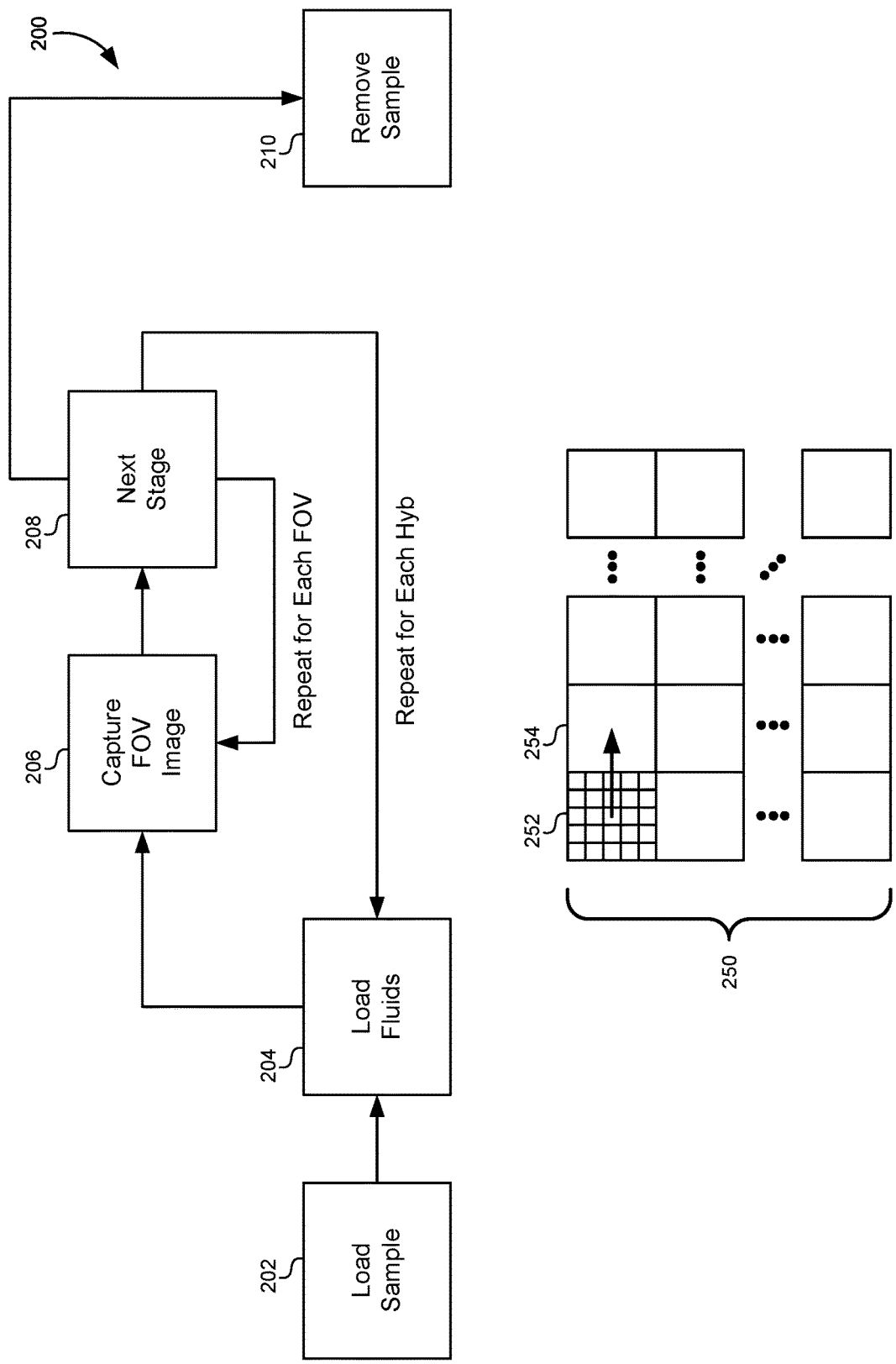
FIG. 2 illustrates a flowchart of a process for capturing multi-omic images of a sample, according to some embodiments.

FIG. 2 illustrates a flowchart 200 of a process for capturing multi-omic images of a sample, according to some embodiments. As described above, the process may include loading a tissue sample on a substrate, such as a coverslip or a slide, and securing the slides inside one of the imaging chambers of the imaging system (202). Note that multiple imaging chambers may operate independently and simultaneously in the same imaging system 100. For example, one imaging chamber 108 may capture images of the sample while another imaging chamber 110 may exchange fluids in the imaging chamber 110. The imaging system 100 may then provide fluids from the fluid system 102 into the imaging chamber 108 (204). These fluids may include fluorophores that are configured to attach to specific cell or tissue types that are to be highlighted in the resulting image.

In order to capture images with high-resolution sufficient to visualize individual cells in detail, the image of the sample may be captured in stages. For example, instead of capturing a single image of the sample, the field-of-view of the camera in the imaging system 100 may be reduced to increase the resolution. Multiple images may then be captured of the sample and stitched together to form an overall image. For example, the overall image 250 may be comprised of multiple sub images that may be captured by the camera at a high resolution. Each of the images may correspond to a field-of-view of the image. Thus, the process may include incrementally capturing a field-of-view image using the camera (206), then moving the camera to a subsequent location with an adjacent field-of-view and preparing the camera for the subsequent stage (208). This process may be repeated until the overall image 250 of the sample has been captured by the individual field-of-view images.

In order to capture the overall image 250, the camera may move its field-of-view in a pattern over the tissue sample. For example, a first field-of-view 252 may be captured (206), then the camera may move to a second field-of-view 254 that is optionally adjacent to the first field-of-view 252 in a grid pattern (208). This process may be repeatedly executed for each field-of-view in the sample until the overall image 250 has been captured. Note that the grid pattern illustrated in FIG. 2 is provided only by way of example and is not meant to be limiting. Other embodiments may move horizontally, vertically, diagonally, and/or in any other pattern that may be used to capture individual field-of-view images that may be combined into the overall image 250.

Multiple overall images 250 of the tissue sample may be captured in order to highlight different features in the tissue sample for the overall multi-omic analysis. Therefore, after the overall image 250 is captured for a particular fluorophore or set of fluorophores, the process may be repeated on the same tissue sample with another fluorophore or set of fluorophores. For example, the previous fluorophores may be pumped out of the imaging chamber 108, cleaning or rinsing agents may optionally be pumped through the imaging chamber 108 to clean the tissue sample, and a new set of fluorophores may be pumped into the imaging chamber 108 for the next image (204). Each overall image captured with different fluorophores to be combined in the multi-omic analysis may be referred to as an "imaging cycle" or a "hyb." Typically, each sample may be subject to a plurality of hybs using different fluorophores. For example, some embodiments may capture two, three, four, five, six, or more overall images of the sample, thereby repeating the cycle (204) multiple times. When the desired number of images of the sample have been captured, the sample may be removed from the imaging chamber 108 (210). A new sample may then be added to the imaging chamber 108 (202), and the imaging process may be repeated.

While this process does provide high-resolution, multi-omic image data, this process also takes a considerable amount of time. At each field-of-view image location, the sample may be illuminated by a plurality of different laser wavelengths (e.g., different colors configured to illuminate different fluorophores in the sample), and thus multiple images may be captured at different wavelengths at each location. Additionally, the sample itself may be adjusted axially to capture multiple images at different Z-depth levels, resulting in three-dimensional image slices through the tissue sample. After capturing an image at each field-of-view location, process may include moving the sample laterally such that the camera captures a new field-of-view location, which may require time for acquiring the new images, physically moving the sample using a piezo motor or stage motor, configuring the laser and the corresponding filter for the desired wavelength, stabilizing and focusing the camera, and/or other operations. Combining these different factors together causes the overall imaging time to be relatively large. For example, each hyb may take approximately 10 hours to complete in an example implementation using a camera with a 40× objective and a 30×30 grid of field-of-view images to cover the sample. A typical four-hyb session may then take between 30-40 hours total to complete. While reducing the resolution of the camera increases the field-of-view and reduces the total number of field view images required, this also negatively affects the quality of the resulting images. This significant time requirement represents a technical problem in the area of biological spatial omics.

In order to solve these and other technical problems the embodiments described herein may use a number of technical improvements in the imaging system to greatly reduce the overall imaging time. A Time Delay Integration (TDI) camera may be used to continuously scan the tissue sample in columns rather than moving between different fields of view. The laser beam that is projected onto the imaging sample may be shaped to approximately match the TDI image scan line. Some embodiments may simultaneously illuminate the tissue sample with different wavelengths in different locations that are captured by individual TDI cameras or portions of a single TDI camera. As described below, these improvements, either alone or in combination serve to dramatically improve the imaging time for the imaging system.

Figure 3:
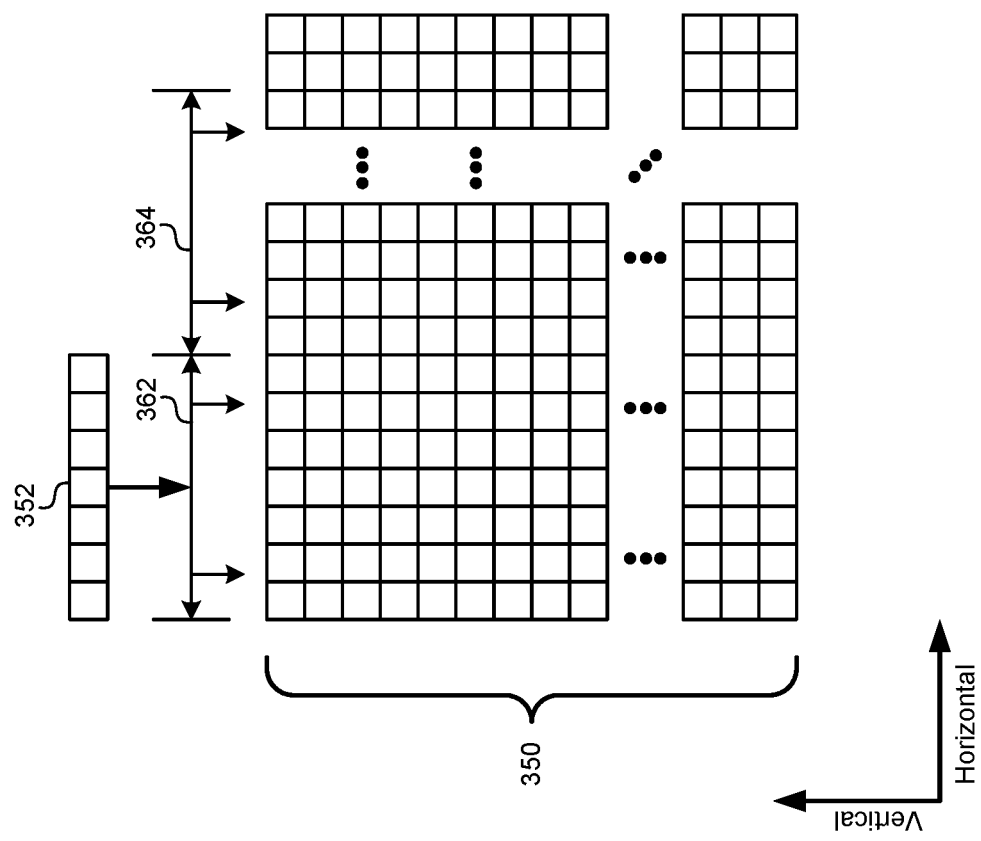
FIG. 3 illustrates a TDI camera that may be used in the imaging system, according to some embodiments.
Figure 3:
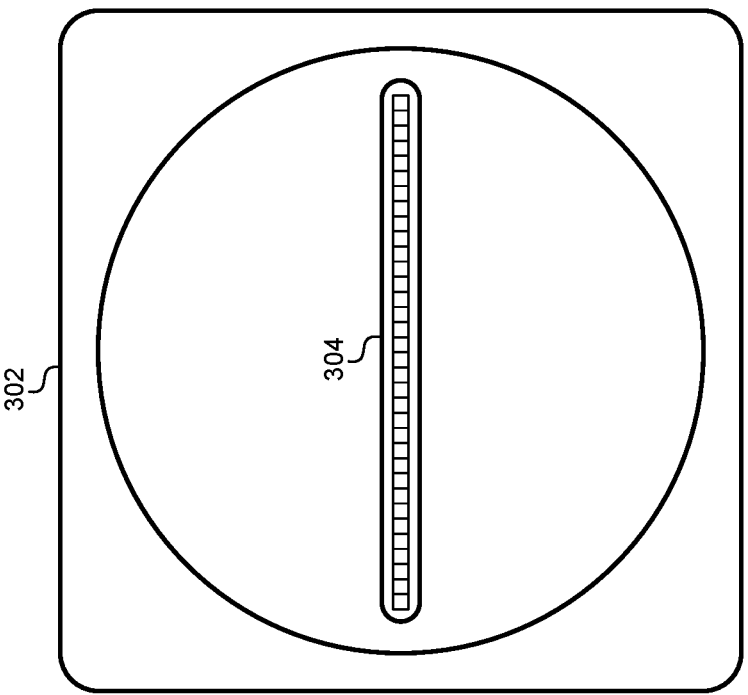

FIG. 3 illustrates a TDI camera 302 that may be used in the imaging system, according to some embodiments. The TDI camera 302 may include a charge-coupled device (CCD) as an image sensor for capturing images. For example, the TDI camera 302 may include a scan line 304 of individual CCD pixels in a horizontal configuration as depicted in FIG. 3. Note that only a single line of pixels is illustrated in this scan line 304 for the sake of clarity. However, this is not meant to be limiting. As discussed and shown below, TDI cameras 302 may include multiple horizontal rows of pixels.

The operation of the TDI camera 302 may be contrasted with the operation of the traditional camera described above. As described above, traditional cameras may capture a single field-of-view, and then move to another, nonoverlapping field-of-view before capturing the next image. Turning back briefly to FIG. 2, a field-of-view 252 may include a horizontal grid of individual pixels within the field-of-view 202, and each of the individual pixels will capture the image simultaneously when the camera shot is acquired. In contrast, the TDI camera 302 may use the scan line 304 of individual pixels. The TDI camera 302 may continuously scan in the vertical direction over the image sequentially. The whole image may then be assembled from the equally spaced lines through the linear field-of-view of the scan line 304. Note that the terms "horizontal" and "vertical" are used merely to denote orthogonal directions as illustrated in FIG. 3 and are not meant to be limiting to a specific direction.

The scan line 304 need not extend the entire horizontal length of the image. Instead, multiple vertical "columns" may be captured using multiple vertical continuous scans. For example, to capture an overall image 350, a scan line 352 may continuously scan down a first vertical column 362 of the imaging area. When the scan of the first vertical column 362 is completed, the scan line 352 of the TDI camera may be repositioned over a second vertical column 364, and the scan line 352 may then continuously scan down the second vertical column 364. These vertical columns may be stitched together to form the overall image 350 of the tissue sample.

Use of the TDI camera 302 represents a significant technical improvement over other cameras in scanning tissue samples. The TDI camera 302 may continuously capture each vertical scan column, which eliminates the need to mechanically reposition the sample, stabilize, focus, and prepare for each individual field-of-view capture. Instead, the TDI camera 302 may move at a constant speed in the vertical direction and scan continuously to accumulate the reflected light or fluorescence signals from the tissue sample. The only repositioning that needs to occur for the TDI camera 302 may be in between each of the vertical column captures. Use of the TDI camera 302 thus increases the speed with which images of the tissue sample may be completely captured, reducing the total time from over 35 hours to about 5 hours in combination with other improvements described below.

Figure 4B:
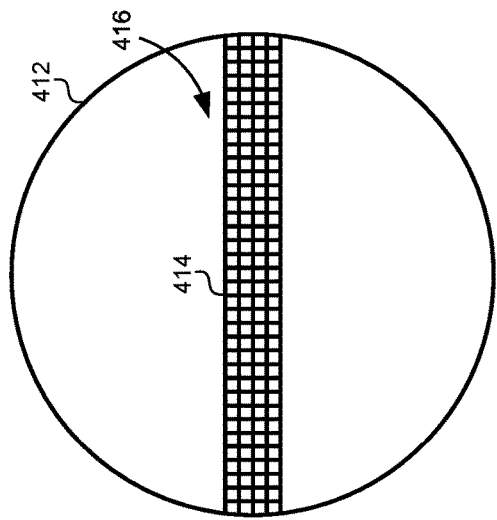
FIG. 4B illustrates an illumination area for a TDI camera, according to some embodiments.
Figure 4D:
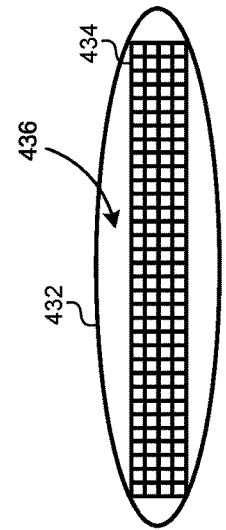
FIG. 4D illustrates an illumination area where the unused light area is minimized by the shape of laser beam, according to some embodiments.
Figure 4A:
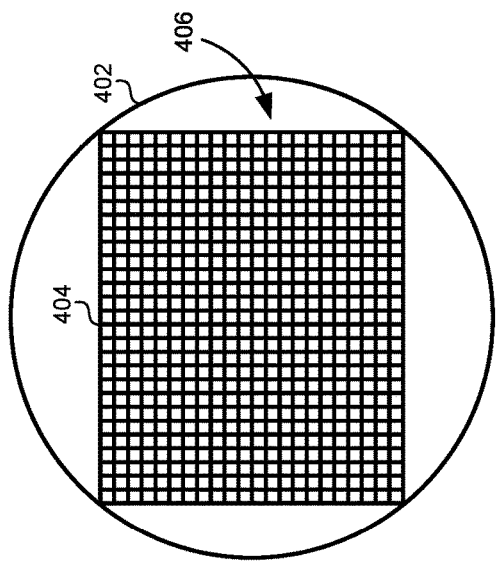
FIG. 4A illustrates an illumination area for a conventional camera, according to some embodiments.

FIG. 4A illustrates an illumination area 402 for a conventional camera, according to some embodiments. As described above, the conventional camera may capture an individual field-of-view 404 of the tissue sample. Within the field-of-view 404, a plurality of individual pixels arranged in a rectangular grid may each simultaneously capture a portion of the field-of-view 404. Before the image is captured, the tissue sample may be illuminated by a laser of using a specified wavelength. The wavelength may be configured to illuminate a certain type of fluorophore present on the tissue sample. Light from the laser may be delivered to the imaging chamber from the laser through a fiber-optic line. Conventionally, the fiber-optic line has a circular shape, such that the output of the light directed onto the tissue sample may be approximately circular in shape. As depicted in FIG. 4, this may result in an illumination area 402 that is approximately circular to encompass the field-of-view 404 of the camera.

Because the circular shape of the illumination area 402 does not precisely match the rectangular shape of the field-of-view 404, an unused light area 406 may be present around the sides of the field-of-view 404. However, the unused light area 406 is relatively small compared to the size of the field-of-view 404 and the overall illumination area 402.

FIG. 4B illustrates an illumination area 412 for a TDI camera, according to some embodiments. As described above, the scan line 414 may include a few horizontal rows of pixels as illustrated in FIG. 4B. However note that the shape of the illumination area 412 still corresponds to the circular output of the conventional fiber-optic line delivering the laser light to the tissue sample. Because the shape of the illumination area 412 is considerably larger and different from the shape of the scan line 414, the unused light area 416 is significantly larger than when using a conventional camera. It has been discovered that it may be detrimental in some situations to overexpose the tissue sample with the wasted light in the unused light area 416. For example, the fluorophores in the unused light area 416 may become damaged, causing the images of those fluorophores to be washed out or have lower contrast. Additionally, reflections of light from the unused light area 416 may interfere when capturing the image with the scan line 414. Therefore, some embodiments may additionally be configured to minimize the unused light area 416 using the methods described below.

Figure 4C:
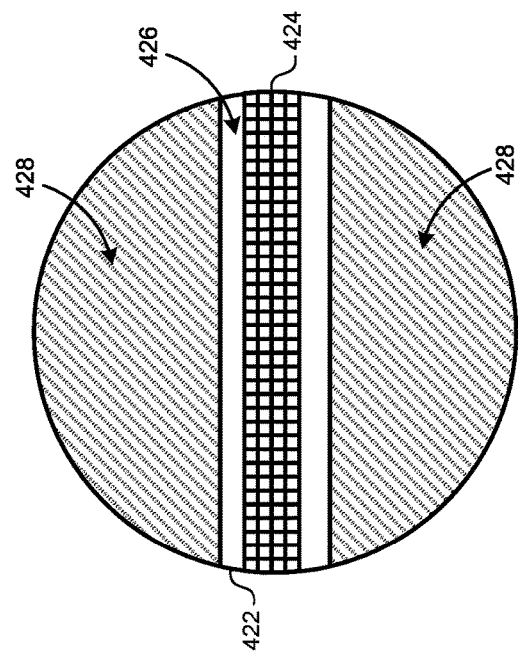
FIG. 4C illustrates an illumination area where the unused light area is minimized with an aperture, according to some embodiments.

FIG. 4C illustrates an illumination area 422 where the unused light area 426 is minimized with an aperture, according to some embodiments. This configuration continues to use the circular light output from the conventional fiber-optic line. However, instead of outputting the entire circular light pattern onto the tissue sample, an aperture 428 may be used to shape the light output. In this example, the aperture may block the top and/or bottom portions of the output of the fiber-optic line such that the illumination area 422 is more rectangular in shape. Generally, this implementation may thus be characterized as providing light to the tissue sample in a shape that is substantially similar to the shape of the scan line 424 of the TDI camera, which in this particular example is rectangular in shape. Note that other camera fields-of-view may be used with different shapes, so this example is not meant to be limiting.

While the general shape of the illumination area 422 on the tissue sample may be configured to substantially match the shape of the scan line 424 of the TDI camera, some embodiments may include a buffer of light around the scan line 424. In the example of FIG. 4C, and unused light area 426 is still present around the scan line 424. While some embodiments may minimize this unused light area 426, other embodiments may allow for an unused light area 426 such that the illumination area 422 is larger than the area of the scan line 424. For example, the unused light area 426 may be between about 5% and 10% larger, between about 10% and 15% larger, between about 15% and 20% larger, between about 20% and 25% larger, between about 25% and 30% larger, between about 30% and 35% larger, between about 35% and 40% larger, between about 40% and 45% larger, between about 45% and 40% larger, between about 50% and 55% larger, between about 55% and 60% larger, between about 60% and 65% larger, between about 65% and 70% larger, between about 70% and 75% larger, between about 75% and 100% larger, or greater than 100% larger than the area of the scan line 424.

FIG. 4D illustrates an illumination area 432 where the unused light area 436 is minimized by the shape of the fiber-optic line, according to some embodiments. Instead of using a circular fiber-optic line, some embodiments may shape the fiber-optic line to be more oval or rectangular in shape to better match the shape of the scan line 334. In this example, an oval fiber-optic line may produce an illumination area 432 that more precisely matches the shape of the scan line 334 as depicted in FIG. 4D. This configuration minimizes the unused light area 436 around the scan line 334, while also minimizing the wasted light output of the laser. Instead of merely blocking the light output using an aperture as illustrated in FIG. 4C, shaping the fiber-optic line may concentrate the light output onto the area of the scan line 334.

In addition to using a TDI camera and shaping the illumination area to match the scan line of the TDI camera, some embodiments may also further improve the throughput of the imaging system by optimizing how multiple images of the same area using different illumination wavelengths may be captured.

Figure 5:
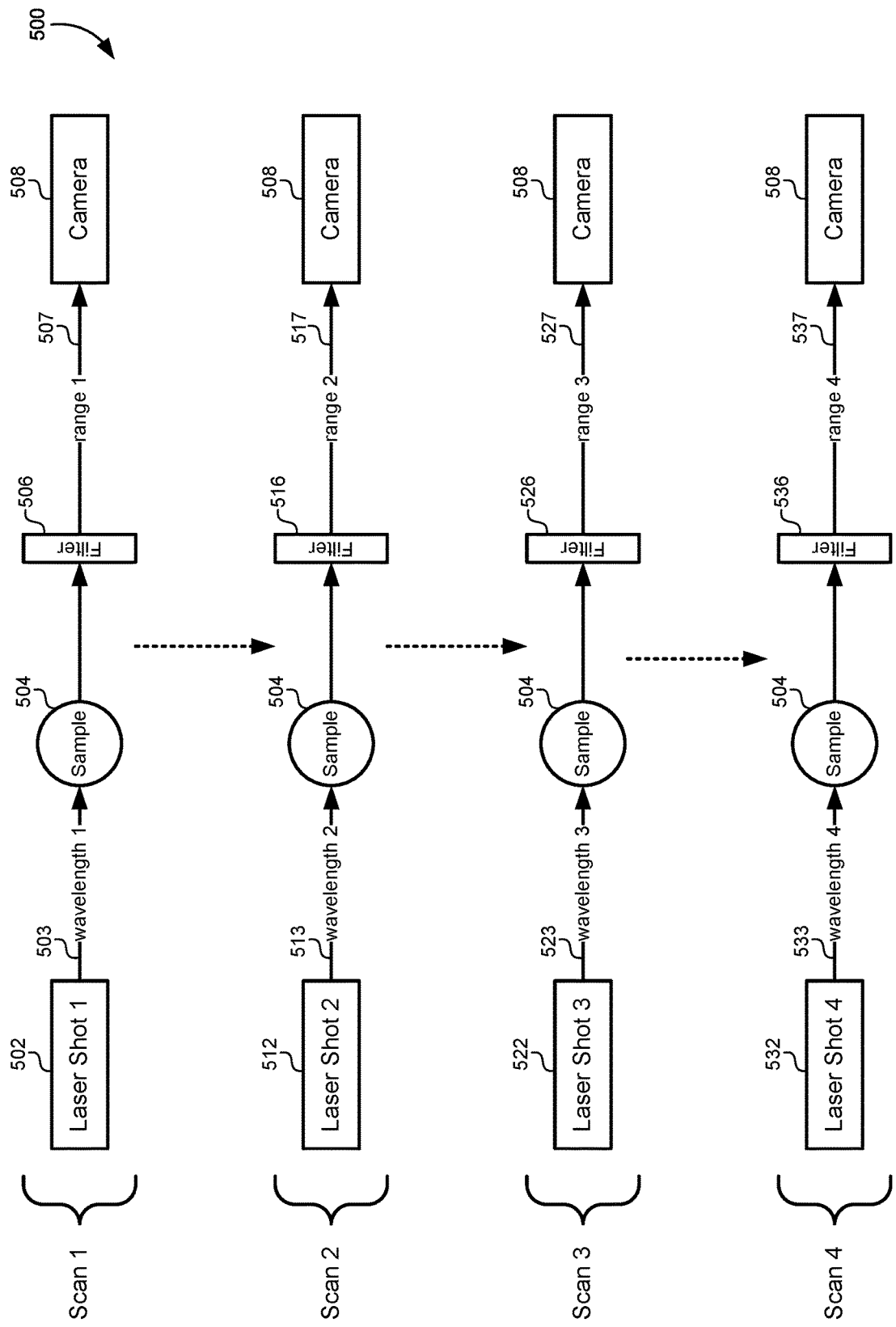
FIG. 5 illustrates how a conventional camera system may capture a plurality of images illuminated by different wavelengths, according to some embodiments.

FIG. 5 illustrates how a conventional camera system may capture a plurality of images illuminated by different wavelengths, according to some embodiments. In this example, each area of the tissue sample may be illuminated by four different wavelengths. A first laser shot 502 may illuminate an area of the tissue sample 504 with a first wavelength 503. Reflected light or fluorescence from the first laser shot 502 may pass through a first filter 506 configured to pass a first wavelength range 507 before being recorded by the camera 508. Note that the first wavelength range 507 may be slightly higher than the first wavelength 503 from the first laser shot 502. Similarly, a second laser shot 512 may illuminate the area of the tissue sample 504 with a second wavelength 513. Reflected light or fluorescence from the second laser shot 512 may pass through a second filter 516 configured to pass a second wavelength range 517 before being recorded by the camera 508. A third laser shot 522 may illuminate the area of the tissue sample 504 with a third wavelength 523. Reflected light or fluorescence from the third laser shot 522 may pass through a third filter 526 configured to pass a third wavelength range 527 before being recorded by the camera 508. A fourth laser shot 532 may illuminate the area of the tissue sample 504 with a fourth wavelength 533. Reflected light or fluorescence from the fourth laser shot 532 may pass through a fourth filter 536 configured to pass a fourth wavelength range 537 before being recorded by the camera 508. The images captured by the camera 508 by each laser shot may be stitched together to form for complete images of the tissue sample, each illuminated by a different wavelength.

Typically, a complete set of field-of-view images may be captured for one each wavelength at each field-of-view location before moving to the next location. Between capturing images at each wavelength, time is required to change the filter wheel, settle the filter wheel, move the motor to account for wavelength-dependent focal plan shifts, and so forth. Therefore, each additional desired wavelength significantly increases the total time for imaging a tissue sample. The embodiments described herein improve this process by capturing multiple wavelengths at once using the camera and the tissue sample.

Figure 6:
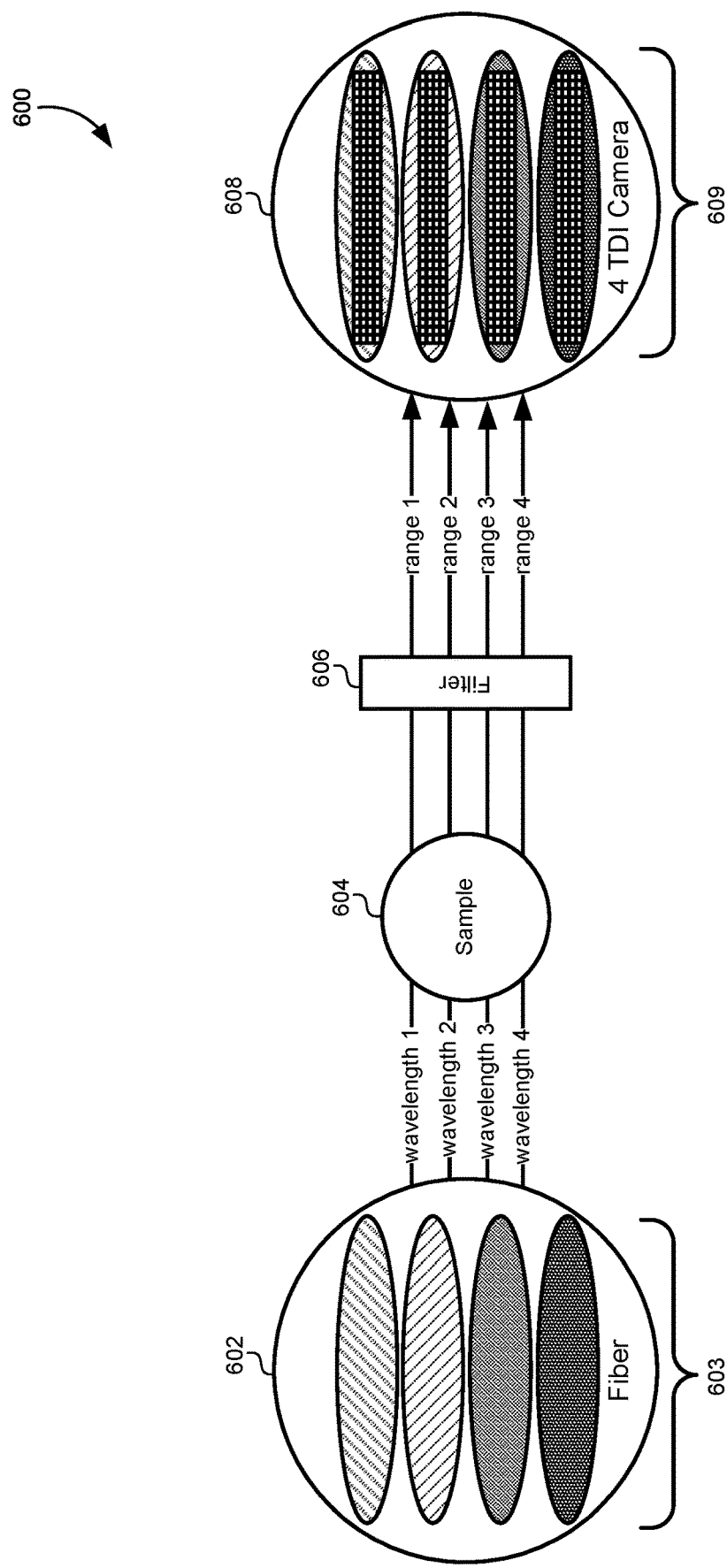
FIG. 6 illustrates an imaging system configuration that allows multiple wavelengths to be captured during a single pass through the tissue sample, according to some embodiments.

FIG. 6 illustrates an imaging system configuration 600 that allows multiple wavelengths to be captured during a single pass through the tissue sample, according to some embodiments. Instead of a single fiber-optic line that delivers a single wavelength, a fiber-optic bundle 602 may deliver four individual fiber-optic lines 603. Each of the individual fiber-optic lines 603 may be shaped in an oval, rectangular, or other shape configured to match the size/shape of the corresponding scan line of the TDI camera. In the example of FIG. 6, the individual fiber-optic lines 603 may have an oval shape, and may be layered in the fiber-optic bundle 602 in a vertical configuration, such that the corresponding illumination areas on the tissue sample are ordered vertically as depicted in FIG. 6. Alternatively, instead of shaping the fiber-optic lines themselves, some embodiments may shape the output beams of circular, square, or any other shape of fiber-optic lines. For example, the output beams may be shaping the beams into an oval shape before or after directing light into or out of the fiber-optic lines.

Each of the fiber-optic lines 603 may individually deliver different wavelengths corresponding to different fluorophores in the tissue sample. Some embodiments may continuously illuminate the tissue sample during the TDI image acquisition process. For example, the four illumination areas corresponding to the fiber-optic lines 603 may continuously be illuminated and scan vertically down the tissue sample 604 with the corresponding scan lines of the TDI camera. A filter 606 may also be positioned and configured to filter out portions of the reflected light or fluorescence off the tissue sample 604 based on the wavelengths of the fiber-optic lines 603. Example configurations of the filter 606 are described in detail below.

The system may also include a TDI camera 608 with four TDI sensors. For example, a TDI camera 608 may include four individual scan lines arranged vertically as depicted in FIG. 6. Each of the scan lines may be configured to scan an area on the tissue sample 604 that is illuminated by the corresponding light from one of the fiber-optic lines 603. Thus, each of the fiber-optic lines 603 may be aligned with and correspond to an individual one of the scan lines 609 of the TDI camera 608. The filter 606 may also include a plurality of individual filters that are aligned with the optical paths between the fiber-optic lines 603 and the scan lines 609 of the TDI camera 608.

These embodiments allow for multiple images, each having a different wavelength, to be simultaneously captured during each vertical column scan of the tissue sample. Instead of using four individual passes through the tissue sample, one for each wavelength, these embodiments may capture any or all of the desired wavelengths in a single pass. This may reduce the total time by as much as 4× for four different wavelengths.

Although FIG. 6 illustrates for individual TDI camera scan lines that may be physically and separately distinct from each other, other embodiments may use a single TDI scan line where the individual pixel rows are subdivided. For example, a single TDI imager may include one set of horizontal scan lines. However, the filter 606 and fiber-optic lines 603 may be configured to reflect light onto different areas of the set pixel rows in the scan line. For example, 3-4 of the pixel rows on the TDI camera may be assigned to one wavelength, while the next 3-4 pixel rows on the TDI camera may be assigned to the next wavelength, and so forth. The software operating the TDI camera 608 may then subdivide these pixel rows out when the image is being processed. Thus, instead of physically separating the scan lines on the TDI camera 608 as illustrated in FIG. 6, some embodiments may instead perform this separation of the different wavelength images in software.

Figure 7:
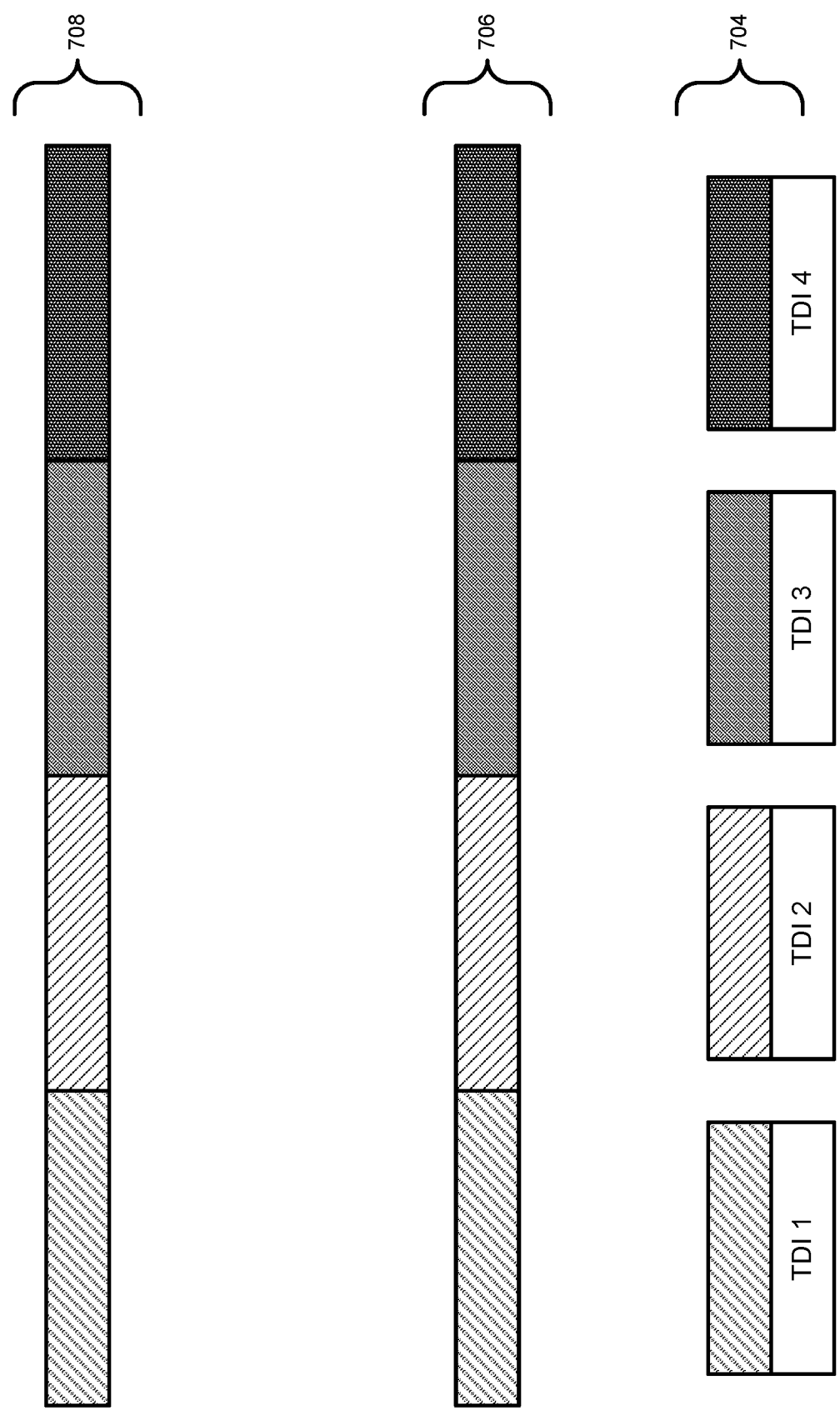
FIG. 7 illustrates different configurations for the filter for simultaneous wavelength capture, according to some embodiments.

FIG. 7 illustrates different configurations for the filter for simultaneous wavelength capture, according to some embodiments. In a first configuration 704, the individual filters may be placed on the scan lines of the TDI camera itself. As described above, the TDI camera may include different scan lines for each different wavelength. The filters may be placed adjacent to the individual scan line pixels for each of the wavelengths as part of the camera construction. A custom CMOS image sensor may be used to integrate the filters onto the camera.

In a second configuration 706, the individual filters may be fabricated together as a cover glass that is placed over the imager. For example a cover may be placed over the TDI imager such that areas on the cover glass for each filter will be in front of the corresponding scan lines of the TDI imager.

A third configuration 708 may place the filters together on a "butcher block" filter at a location corresponding to an intermediate focal plane of the TDI imager. In some embodiments, the third configuration 708 may be configured as a filter wheel.

Figure 8:
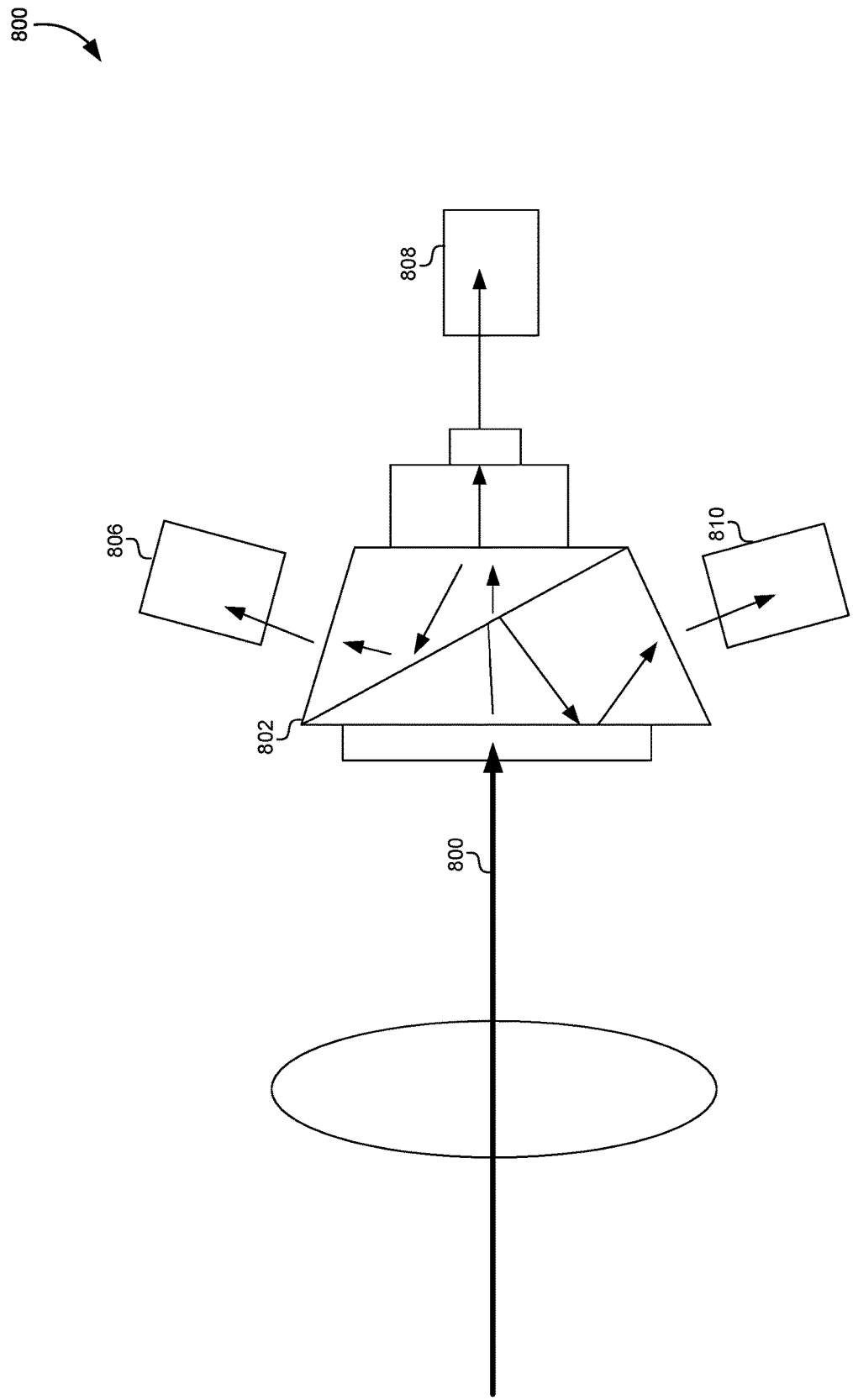
FIG. 8 illustrates a configuration using beam splitters to separate out the different wavelength images.

FIG. 8 illustrates a configuration using beam splitters to separate out the different wavelength images. Instead of using four different laser wavelengths that illuminate different areas on the tissue sample, some embodiments may illuminate the tissue sample using a broad-spectrum light that combines each of the desired wavelengths into a single illumination area on the tissue sample. The reflected light or fluorescence 800 from the tissue sample may then pass through a beam splitter 802. The beam splitter 802 may then separate out the different wavelengths in the reflected light or fluorescence 802 onto separate TDI imagers 806, 808, 810.

Figure 9:
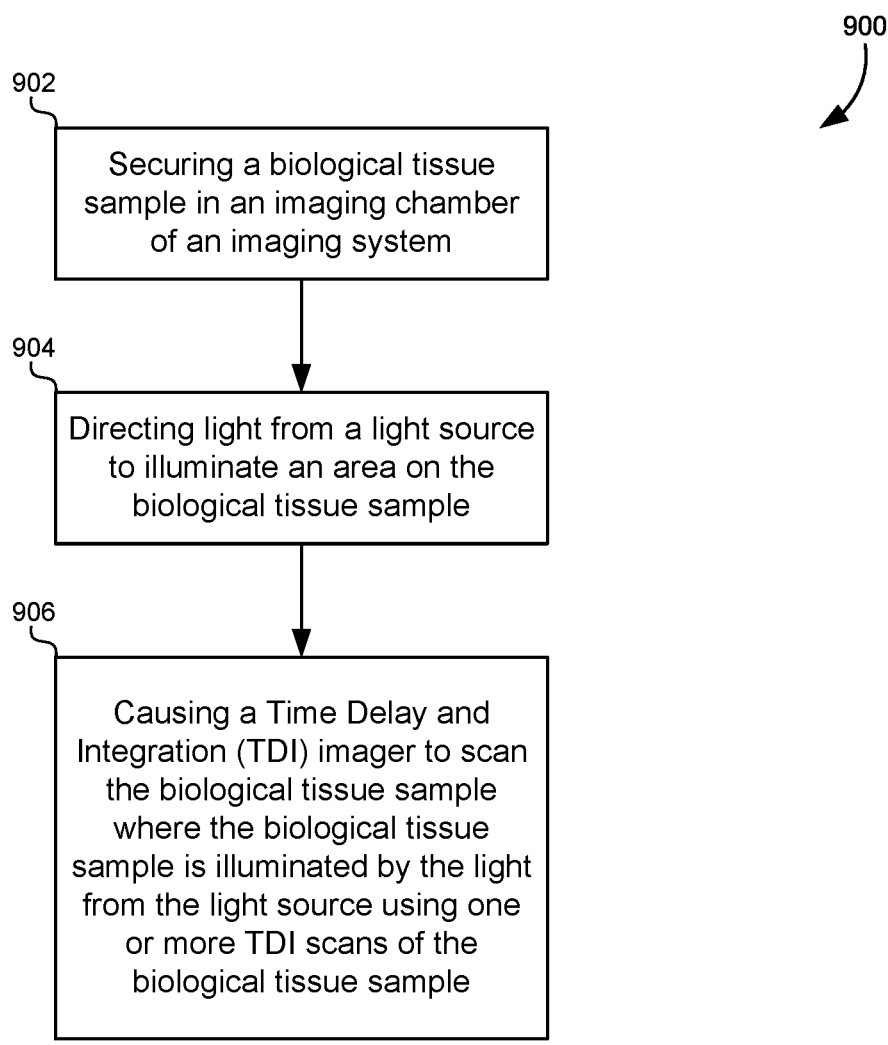
FIG. 9 illustrates a flowchart of a method of capturing spatial-omic images of a biological tissue sample.

FIG. 9 illustrates a flowchart 900 of a method of capturing spatial-omic images of a biological tissue sample. The method may include securing a biological tissue sample in an imaging chamber of an imaging system (902). The method may also include directing light from a light source to illuminate an area on the biological tissue sample (904). The method may further include causing a TDI imager to scan the biological tissue sample where the biological tissue sample is illuminated by the light the light source using one or more TDI scans of the biological tissue sample (906). Each of these operations may be carried out as described in detail above.

It should be appreciated that the specific steps illustrated in FIG. 9 provide particular methods of capturing spatial-omic images of a biological tissue sample according to various embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user.

For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
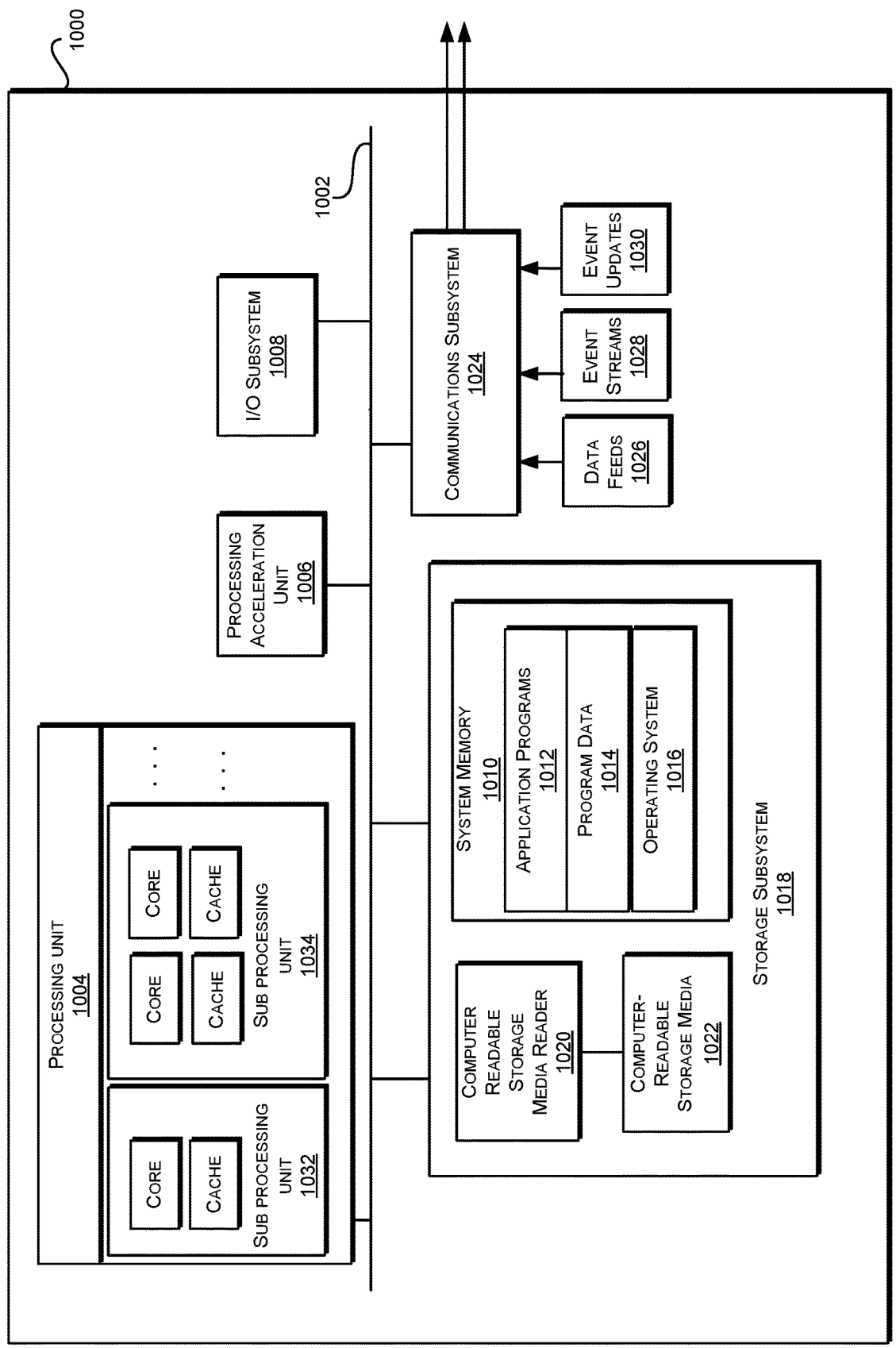
FIG. 10 illustrates an exemplary computer system, in which various embodiments may be implemented.

FIG. 10 illustrates an exemplary computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with some embodiments.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. An imaging system for capturing spatial-omic images of biological tissue samples, the imaging system comprising:
   an imaging chamber configured to secure a biological tissue sample placed in the imaging system;
   a Time Delay and Integration (TDI) imager comprising a plurality of scan lines;
   a light source and a fiber optic bundle comprising a plurality of fiber-optic lines, wherein each of the plurality of fiber-optic lines is configured to deliver light of different wavelengths to illuminate an area on the biological tissue sample that is being captured by a set of corresponding scan lines of the TDI imager; and
   a controller configured to cause the TDI imager to scan the biological tissue sample using one or more TDI scans of the biological tissue sample.

2. The imaging system of claim 1, wherein the controller causes the TDI imager to scan the biological tissue without requiring a mechanical repositioning, stabilization, or focus between capturing scan lines in a column.

3. The imaging system of claim 1, wherein at least one fiber-optic line projects light in an illumination area that is approximately circular onto the biological tissue sample.

4. The imaging system of claim 1, wherein the light source delivers light to the biological tissue sample through at least one fiber-optic line with an aperture having a rectangular shape.

5. The imaging system of claim 4, wherein the aperture projects a rectangular illumination area onto the biological sample onto a rectangular field-of-view of the TDI imager.

6. The imaging system of claim 1, wherein the light source delivers light to the biological tissue sample through at least one fiber-optic line with an aperture having a having a shape that matches a shape of a field-of-view of the TDI imager.

7. The imaging system of claim 1, wherein each of the plurality of fiber-optic lines have an oval or rectangular shape.

8. The imaging system of claim 1, wherein each of the plurality of fiber-optic lines is positioned to direct light at different portions of the biological tissue sample.

9. A method of capturing spatial-omic images of a biological tissue sample, the method comprising:
securing a biological tissue sample in an imaging chamber of an imaging system;
directing light from a light source through a fiber-optic bundle comprising a plurality of fiber-optic lines, wherein each of the plurality of fiber-optic lines is configured to deliver light of different wavelengths to illuminate an area on the biological tissue sample; and
causing a Time Delay and Integration (TDI) imager to scan the biological tissue sample where the biological tissue sample is illuminated in individual areas corresponding to each of the plurality of fiber-optic lines that are captured by corresponding sets of scan lines of the TDI imager using one or more TDI scans of the biological tissue sample.

10. The method of claim 9, further comprising assembling equally spaced lines from a plurality of scan line columns from the TDI imager.

11. The method of claim 9, wherein the light from the light source comprises a plurality of distinct wavelengths that are simultaneously projected on the biological tissue sample.

12. The method of claim 11, further comprising filtering the plurality of distinct wavelengths using a plurality of filters in front of the TDI imager.

13. The method of claim 11, further comprising filtering the plurality of distinct wavelengths using a beam splitter in front of the TDI imager.

14. An imaging system for capturing spatial-omic images of biological tissue samples, the imaging system comprising:
an imaging chamber configured to secure a biological tissue sample placed in the imaging system;
a Time Delay and Integration (TDI) imager;
a light source configured to illuminate areas on the biological tissue, each area being simultaneously illuminated with a distinct wavelength; and
a controller configured to cause the TDI imager to simultaneously capture a plurality of distinct images of the biological tissue sample, wherein each of the plurality of distinct images corresponds to one of the plurality of distinct wavelengths captured by a corresponding set of scan lines of the TDI imager.

15. The imaging system of claim 14, wherein the TDI imager comprises a plurality of scan lines, and each of the plurality of scan lines captures one of the plurality of distinct images.

16. The imaging system of claim 14, wherein the TDI images comprises a plurality of individual TDI cameras, and each of the corresponding sets of scan lines corresponds to one of the plurality of individual TDI cameras directed at a different location on the biological tissue sample to simultaneously capture the plurality of distinct images.

17. The imaging system of claim 14, further comprising a filter wheel in front of the TDI imager comprising a plurality of filters corresponding to the plurality of distinct wavelengths.

18. The imaging system of claim 14, wherein the light source comprises a broad-spectrum light source that combines the plurality of distinct wavelengths onto a single illumination area.

* * * * *